United States Patent [19]
Scholz et al.

[11] 3,772,666
[45] Nov. 13, 1973

[54] INTERLACED MAGNETIC HEADS

[75] Inventors: Max Scholz, Carlisle; Carmen P. Grasso, Methuen, both of Mass.

[73] Assignee: Data General Corporation, Southboro, Mass.

[22] Filed: Apr. 3, 1972

[21] Appl. No.: 240,604

[52] U.S. Cl. .......... 340/174.1 C
[51] Int. Cl. .......... G11b 5/56
[58] Field of Search .......... 340/174.1 C, 174.1 F; 179/100.2 CA, 100.2 C

[56] References Cited

UNITED STATES PATENTS

| | | | |
|---|---|---|---|
| 3,478,341 | 11/1969 | Trimble | 340/174.1 C |
| 3,544,980 | 12/1970 | Applequist | 340/174.1 C |
| 3,646,536 | 2/1972 | Bleiman | 340/174.1 C |

*Primary Examiner*—Vincent P. Canney
*Attorney*—Robert F. O'Connell et al.

[57] ABSTRACT

A magnetic disk memory storage system using fixed recording heads with one or more magnetic storage disks, wherein the recording heads are mounted on one or more arm assemblies, each arm assembly having at least a pair of end portions on each of which head pads having a plurality of recording heads are mounted in a gimballed fashion. The head pads in which the recording heads are embedded are arranged so that the recording heads on each head pad of each end portion have a fixed, interlaced relationship with the recording heads on the head pads of each other end portion of the same arm assembly. Means are further provided for controllably moving the arm assemblies to and away from their fixed operating positions with reference to their associated disk surfaces. The controllable moving means are arranged so that the recording heads are always placed in their correct tracking relationships with their corresponding data tracks when they are moved to their operating positions and so that the recording heads can be safely and reliably moved away from their associated disk surfaces without damage to the heads or to such surfaces.

23 Claims, 14 Drawing Figures

PATENTED NOV 13 1973 3,772,666

INTERLACED MAGNETIC HEADS

This invention relates generally to magnetic disk data storage systems and, more particularly, to such systems as use multiple magnetic storage disks and multiple, fixedly mounted read-write recording heads used in association therewith.

BACKGROUND OF THE INVENTION

Since the introduction of magnetic disk file systems in the middle 1950s, the use of magnetically coated disks for memory storage has become increasingly prevalent in the data processing industry and their use is expected to continue to rise in the future. Magnetic disk storage systems offer an effective compromise in many applications between the use of magnetic tape storage systems, which have relatively large storage capacities but which require relatively long access times, and the use of magnetic core storage systems which have relatively fast access times but which have relatively limited storage capabilities. A magnetic disk system offers a means for obtaining reasonably large storage capacity, although not as large as magnetic tape storage devices, and a reasonably fast access time, although not as fast as magnetic core storage devices.

In view of the increasing popularity of magnetic disk storage systems, a need arises for a system which can be relatively easily and inexpensively fabricated, installed and maintained and which further permits the interchangeability of recording heads without the need for re-alignment thereof with the magnetic storage tracks on the disk surface, presently known systems requiring relatively complicated alignment procedures and equipment.

DESCRIPTION OF THE PRIOR ART

Prior art magnetic disk storage systems basically fall into two principal categories, the first utilizing a single permanently mounted magnetic disk together with a plurality of fixedly mounted recording heads, each head being separately mounted from the others of the system in alignment with a single specified magnetic track of the disk. A second category of such systems uses either a single magnetic disk or a plurality of stacked, magnetic disks mounted in parallel relationship to each other on the same rotating shaft, the recording surface of such disks utilizing a single, movable recording head, which single head by its radial movement relative to its associated recording surface provides access to all of the tracks on the disk surface.

The use of fixed head systems as opposed to movable head systems provides an advantage in decreasing the access time of the overall system, since a movable head must be radially moved to the desired storage track on the disk surface before the circumferential movement of the disk permits the head to obtain access to the desired information on any particular track. However, the use of fixed head systems, as in presently available single disk apparatus, gives rise to certain installation problems, particularly with reference to the alignment of the fixed heads with their associated storage tracks. Further, the fabrication of such systems involves generally increased costs over movable head systems because of the need for a larger number of recording heads than are required in movable head systems.

One presently available fixed head system, in which a plurality of recording heads are used with a single magnetic disk recording surface, uses a number of different adjustable mounting means on a single mounting plate, each mounting means containing a plurality of recording heads. An example of such a system is the Model 4019A system made and sold by Data General Corporation of Southboro, Massachusetts. So long as the same mounting plate, with its recording heads fixedly mounted thereon, is used with a single, permanently mounted magnetic disk, the system can store and retrieve information recorded on the surface of the disk without any alignment problems between the heads and their associated tracks. However, replacement of the magnetic disk with a disk on which information has been stored by an independent apparatus, and/or replacement of one, or more, or all of the recording heads, is not easily possible without the use of relatively elaborate alignment procedures for re-aligning the heads and their associated recording tracks.

Moreover, the costs of fabricating and installing such a system are relatively large, since the mechanical complexity thereof is appreciable. The overall alignment of heads to tracks is subject to problems which arise in connection with the accurate positioning of a large number of elements on a single relatively large plate. Apart from the basic problem of initially mechanically locating all of the heads in correct relative positions on the plate, an additional problem arises with respect to changes in mounting plate dimensions and, hence, the locations of the recording heads due to thermal effects during use. Because the plate is relatively large in comparison with the head elements mounted thereon, temperature variations can cause sufficiently large changes in the dimensions of the plate so as to move the head elements out of alignment with tracks on the disk surface even though such alignment was achieved during the fabrication and installation thereof. Moreover, it is difficult, if not impossible, adequately to take such thermal changes into account ahead of time, since the thermal variations over the area of the mounting plate are generally not uniform and the pattern of thermal changes is usually unpredictably distorted. Thus, dimensional changes due to thermal effects cannot easily be determined or otherwise taken into account in any subsequent re-alignment and calibration procedures.

Thus, while fixed head systems are available, they are subject to the above discussed difficulties and have been successfully used only in single disk systems. The only multiple disk systems presently commercially available use movable heads and, accordingly, the advantages of fixed head systems have up to now not been realizable with multiple disk systems. While it has been suggested that it might be possible to utilize multiple stacked magnetic disks with fixed heads, up to the present time no feasible system of this nature has yet been devised that is sufficiently easy and inexpensive to fabricate and use so as to be practical.

Further, the tendency in presently available systems having a fixed head configuration is to use relatively expensive "hard" disks, that is, disks the recording surfaces of which are formed from a coating of magnetic material having a thin protective film of extremely durable material, such as nickel alloy, placed thereon. So long as the protective film is thin enough, the disk surface is very effectively protected without any detrimental effect on the magnetic characteristics of the surface for data recording and retrieval purposes. Because of the presence of the protective film, damage to the magnetic coating is virtually eliminated, particularly such damage as is likely to occur, for example, when the recording heads accidentally come into contact with (i.e., "crash" on to) the disk surface. When such a crash occurs, for example, on a "soft" disk, i.e., a disk the magnetic coating of which is unprotected, not only can the coating itself become damaged but any data stored thereon can be removed, either partially or completely, as a result of the crash.

However, the use of "hard" disks, particularly in a multiple disk system, undesirably increases the overall cost of the system, since the cost of "hard" disks can be as much as two orders of magnitude greater than that of "soft" disks. Thus, it is desirable to develop a multiple disk, fixed-head system which can utilize "soft" disks but in which the dangers arising from crashes of the recording heads on to the recording surfaces of the disk is minimized. In a system which uses "soft" disks, even in those cases where crashes occur, the cost of replacing the entire disk involved is relatively small in view of their relatively minimal costs in comparison with the costs of "hard" disks.

DESCRIPTION OF THE INVENTION

This invention is a magnetic disk memory storage system which utilizes a plurality of stacked disks together with a plurality of fixed heads associated with each operating magnetic storage surface of such disks, which system can be practically implemented so as to be fabricated in a relatively easy and inexpensive manner, while permitting accurate alignment, installation and use in a much simpler fashion than in any previously known fixed head system, even of a single disk type. Further, the system of the invention is adapted for use with relatively inexpensive "soft" disks so that, coupled with generally lower fabrication and installation costs, the overall cost of the system is at least comparable or lower than than of present multi-disk systems using moving heads.

In a preferred embodiment of the system of the invention each operating storage surface of a magnetic disk has associated therewith at least one arm assembly which includes a pair of suspension arms, the end portions of which each have a plurality of recording heads flexibly mounted thereon so that recording heads on one end portion are suspended therefrom during operation independently of the suspension of the recording heads on the other end portion. Further, the arrangement of the recording heads on the two end portions permits the recording heads to be fixedly located thereon so that the plurality of heads on one end portion have a fixed, interlaced spatial relationship with respect to the plurality of heads on the other end portion.

The suspension arms of the arm assembly are flexibly joined to a common rigid support member remote from the end portions on which the recording heads are flexibly mounted, the overall arm assembly being uniquely mounted at said support member on a rotatable shaft which is in turn mounted in a predetermined fixed relationship with reference to the magnetic storage disk with which it is associated so that when the arm assembly is rotated to its fixed operative position, the interlaced recording heads on the end portions thereof are accurately aligned with their respective tracks on the magnetic disk surface.

During operation, the independent suspension of the recording heads permits them to "fly" independently on air bearings formed between the recording heads and the disk surface so that any movement of one does not affect the other. Moreover, the arm assembly is further arranged so that if it is desired that the heads be removed from their operative position adjacent the storage disk to a non-operative position with respect thereto, the suspension arms thereof and the recording heads mounted thereon can be effectively lifted simultaneously from the surface of the disk and moved to a non-tracking position through the use of a rigid crossbar member which operates in conjunction with an appropriate cam surface arrangement for removing all of the heads on a particular arm assembly simultaneously from their air-bearing relationship with the disk surface so that the overall arm assembly can be moved to the non-operative position without damage to the disk surface.

By the use of such an arm assembly the fixed interlaced relationship among the recording heads on each arm thereof can be established when the assembly is fabricated rather than when the heads are installed in the system. Because of the unique manner of affixing the arm assembly to the shaft, once the arm assembly is mounted on the shaft, the recording heads are automatically aligned in their correct position for tracking. Such a structure avoids the need for any elaborate electrical alignment techniques which require the ready availability of a pre-recorded master disk and associated equipment, as discussed above. Moreover, the arm assemblies which are so fabricated can be readily interchanged in the field without the need for realignment and a great savings in time, labor and other costs during installation and subsequent maintenance is achieved. Moreover, the fabrication of the arm assembly is a relatively inexpensive process, the assembly being capable of having a relatively large number of heads mounted on each suspension arm so that the overall costs and ease of fabrication and installation is greatly improved over any previously known or suggested fixed head systems, whether used with multiple or single disk arrangements. Finally, the dimensions of the arm assembly are such that thermal changes in the environment in which the arm assembly operates are not sufficient to cause the recording heads to become mis-aligned with their respective tracks.

The invention further includes a unique arm mounting and positioning mechanism which permits the arm assembly affixed thereto to be correctly positioned during use not only in its rectangular coordinates but also in its angular orientation with reference to the storage disk surface with which it is associated. The arm assembly positioning mechanism is arranged so that it can controllably move the arm assembly from its tracking position to a non-tracking position very rapidly if desired, as when a power failure occurs, for example, so that "crashes" of the recording head thereon on to the magnetic coated surface of the disk are easily avoided. The position mechanism is arranged so that it then controllably returns the arm assembly to its exact and correct operative position for subsequent use.

More specifically, the region of the arm assembly which is mounted on the shaft of the positioning mechanism has a uniquely configured cutout portion permitting it to be keyably mounted to the shaft so that, by the use of a single fastening element, the arm assembly is accurately positioned in all three linear coordinate directions as well as in its angular orientation.

Further, the shaft of the positioning mechanism has an appropriately designed magnetic drive system including appropriately mounted stop elements which permit the shaft to be rotated to predetermined position limits corresponding to the correct operative tracking position and an approproate non-operative position of the recording heads. The positioning mechanism is, thus, arranged so that, as mentioned above, should it be desirable to remove the recording heads from the disk without damage to the surface thereof, as when a power failure occurs, the shaft can be rapidly and reliably rotated from its correct tracking position to the non-operative position. When power is again turned on, the shaft is then automatically returned to its correct tracking position for continued operation.

The invention can be described in more detail with the assistance of the accompanying derawings wherein FIG. 1 shows a plan view of one embodiment of the overall apparatus of the invention;

Figure 1:
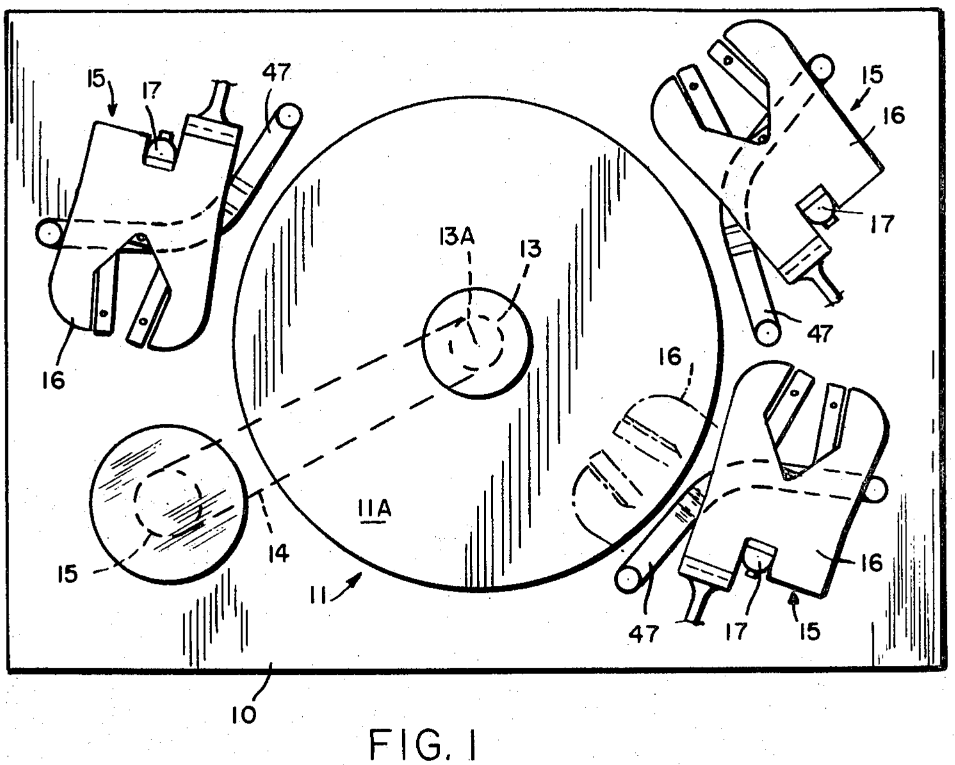

As seen in FIG. 1, a preferred embodiment of the overall magnetic storage system of the invention is shown in plan view generally as comprising a plurality of stacked magnetic storage disks in the form of a conventional disk pack 11, which disks are located on a frame 10 and are driven at an appropriately desired rotating speed (usually 3,600 rpm) by a suitable disk motor (not shown) which drives a shaft 13 on which the disks are mounted via a drive belt 14 interconnecting shaft 13 with disk motor shaft 15. The multiple disk pack configuration is well known to those in the art, such stacked disk packs being readily available from a variety of sources, one such pack being made and sold as Model 2316 by International Business Machines. Multiple disk packs of this nature are normally used with a plurality of moving recording heads, a single moving head being associated with each of the storage surfaces of the disks in the system. For example, in multiple disk, movable head systems, both surfaces of each of the disks are often used for storage purposes, except for the exterior surfaces of those disks on each end of the stack, which latter surfaces are not coated with magnetic material but are instead metal plates used primarily as protective end plates for the overall disk pack, such as top end plate 11A shown in the plan view of FIG. 1.

In the embodiment of the system of the invention illustrated in FIG. 1, a plurality of recording head arm assembly stations 15 are positioned on frame 10 effectively adjacent the perimeter of disk pack 11. Each arm assembly station has one or more arm assemblies 16 which are affixed to arm assembly shafts 17 mounted at fixed predetermined distances from the center 13A of the disk pack shaft 13. Each of such arm assemblies 16 has a plurality of recording heads, as discussed in more detail later, which are used to store and retrieve ("read/write" heads) data on data storage tracks on the magnetic storage surfaces of the disks with which each is associated.

In all cases the arm assembly stations 15 are all essentially the same. As can be seen in the general configuration shown, the arm assembly shafts 17 are appropriately connected to suitable magnetically operated drive means described in more detail in connection with subsequent figures of the drawing.

Broadly described, the system of the invention permits the arm assemblies 16 to be rotatably moved into and away from their operative positions, such arm assemblies being mounted on their respective shafts in such a manner that when rotated into their operative, or tracking, positions the recording heads mounted thereon are correctly aligned with their respective tracks on a magnetic disk storage surface. The magnetic drive means associated with each shaft 17 have appropriate stop mechanisms for assuring that the arm assemblies are rotated to and are held at their correct tracking positions each time the system is put into use. The details thereof are described with reference to FIGS. 10–12. Further, such magnetic drive means include safety mechanisms for removing the arm assemblies and recording heads thereon from the disk surfaces by appropriate rotation of the shafts from their operative positions to non-operative positions should a power failure occur, for example, so as to avoid "crashes" of the heads on the disk surface.

An exemplary arm assembly of the system shown in FIG. 1 is discussed in more detail with reference to FIGS. 3–9. Because of their identical structures, only one arm assembly is described in detail herein, it being understood that such assemblies are effectively interchangeably used in the system at any one of the stations shown in FIG. 1. As can be seen in the figures, an arm assembly 15 includes a rigid mounting plate 20 at one end thereof, plate 20 having a substantially square cutout portion 21 at a substantially centrally located region thereof, at which region the arm assembly is affixed to a rotatable arm assembly shaft 17 in a manner discussed in more detail below with reference to FIG.

7. A pair of recording head suspension arms 22 and 23 are fixedly attached to mounting plate 20 through a pair of intermediate arm load spring members 24 and 25 which are each fastened at one end as by welding to opposite end regions of one side of mounting plate 20 and at their other ends to suspension arms 22 and 23, respectively. The suspension arms which extend from mounting plate 20 are angularly disposed in a converging manner with respect to each other, as shown. The particular angular orientation and the positioning thereof with respect to the magnetic disk surface 26 with which they are associated are discussed in more detail below.

An appropriate flexible circuit 27 of a type well known to those in the art is attached to mounting plate 20 and has embedded therein a plurality of circuit leads 27 which are soldered at selected points to suitable circuit elements (not shown) affixed thereto. While not discussed or shown in detail, the circuit leads and circuit elements soldered thereto are generally connected between a plurality of recording heads 29 at the outer end of suspension arms 22 and 23 and a connector member 30 formed adjacent mounting plate 20 for connection to external circuitry, such as to power lines or other suitable circuitry as required. The details of the flexible circuit construction and its manufacture as well as the specific circuit schematic configuration are known to those in the art and it is not necessary further to describe such structure in greater detail here.

In order to maintain the flexible circuit in its desired position with reference to the recording heads it is bonded to appropriate L-shaped metallic stiffener members 31 and 32 attached near the outer ends of suspension arms 22 and 23, respectively.

Figure 6:
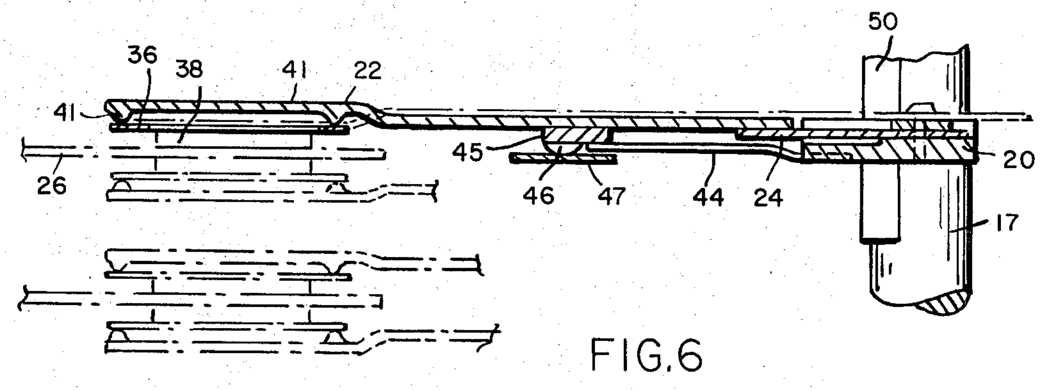
FIG. 6 shows a view in cross-section taken along the line 6—6 of FIG. 5.
Figure 8:
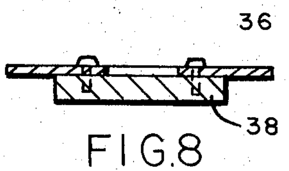
FIG. 8 shows an enlarged view in cross-section taken along the line 8—8 of FIG. 5.
Figure 9:
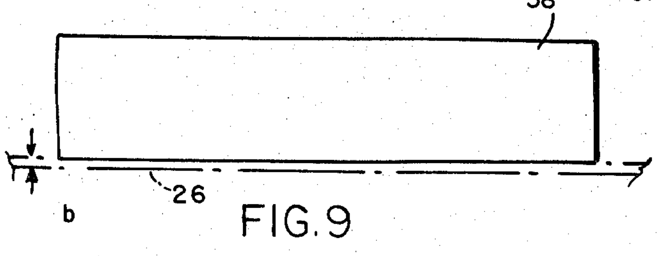
FIG. 9 shows an enlarged view in outline of an exemplary head pad structure in the embodiment of the invention of FIG. 5.
Figure 7:
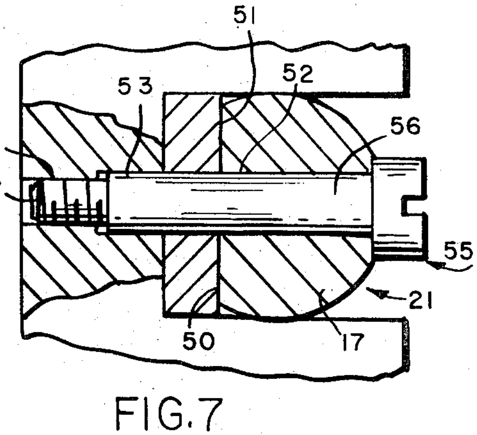
FIG. 7 shows an enlarged view of a portion of the embodiment of the invention shown in FIG. 5.

Flexible diaphragm spring members 36 and 37 of a substantially rectangular configuration are attached to the outer ends of suspension arms 22 and 23. Each of said diaphragm spring members has affixed thereto substantially rectangularly shaped head pad members 38 and 39, respectively, in which are embedded a plurality of recording heads 19, as shown best in FIG. 5. Spring members 36 and 37 each have a pair of tabs 40 at opposite ends thereof which are welded to corresponding pairs of posts 41 at the ends of the suspension arms, as shown in FIG. 6.

Thus, head pads 38 and 39 are flexibly mounted in an effective gimballed fashion on the suspension arms so that when the overall arm assembly is positioned adjacent its associated magnetic disk surface, each of the head pads is operatively suspended for motion in all directions independently of the other. Since the gimbal spring members 36 and 37 are of a flexible nature, there is no rigid connection between the head pads, and each head pad, thereby, can effectively operate in such independently suspended manner during use. When the system is in operation an air bearing on which the recording heads ride is thereby formed between the recording heads and the surface of the disk, as shown by air bearing *b* of FIG. 9.

Figure 4:
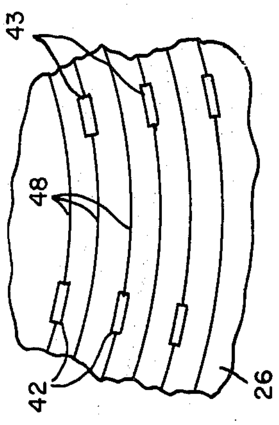
FIG. 4 shows an enlarged diagrammatic view of the head and track arrangement of the arm assembly of FIG. 3.
Figure 5:
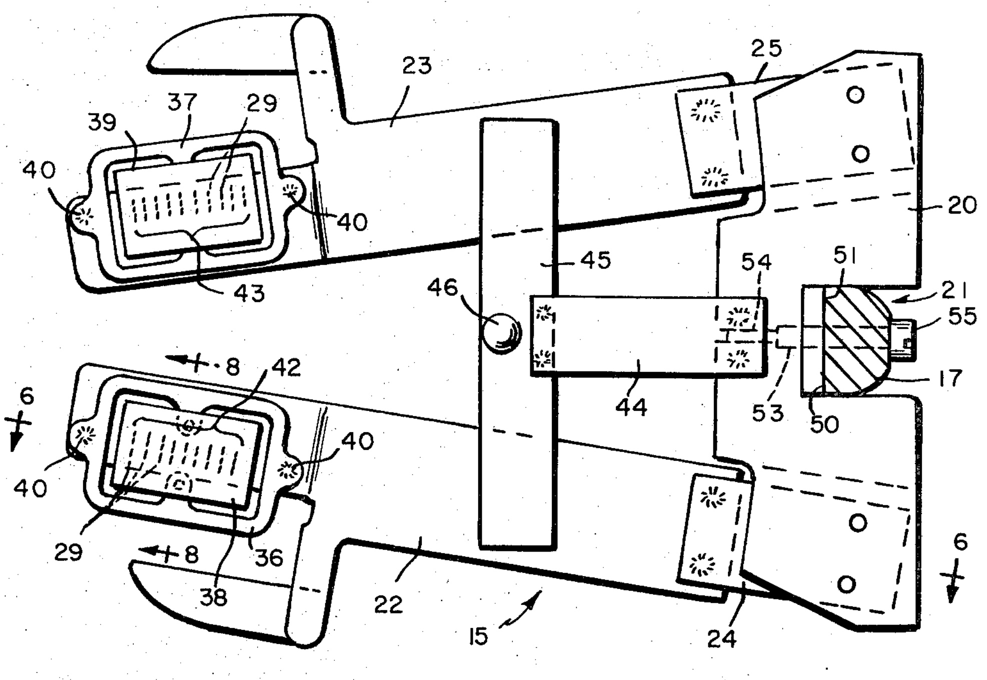
FIG. 5 shows a plan view of the other side of the arm assembly of FIG. 3 with the flexible circuitry thereof omitted.

Further, in the fabrication of the arm assembly the head pads are mounted in such a manner that the first plurality of recording heads 42 on head pad 38 have a fixed interlaced spatial relationship with the second plurality of recording heads 43 on head pad 39, with reference to the recording tracks 48 of the magnetic disk surface with which they are associated, as shown best diagrammatically in FIG. 4. Once the elements of an arm assembly have been arranged in their desired fixed relationships during fabrication, other arm assemblies which are fabricated with the same fixed relationships are interchangeable therewith. Once any such arm assembly is affixed to its associated arm assembly shaft, as discussed below, all of the recording heads thereon are automatically aligned with their respective tracks on the magnetic disk surface when the arm assembly is rotated to its operative position.

Figure 2:
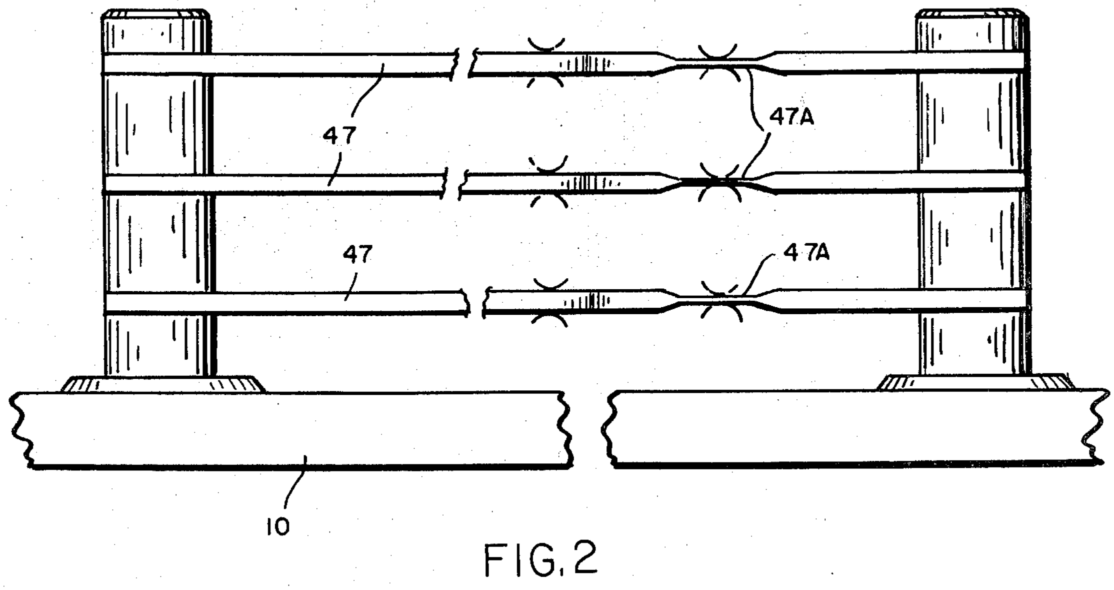
FIG. 2 shows the cam surface of the embodiment of the invention shown in FIG. 1.
Figure 3:
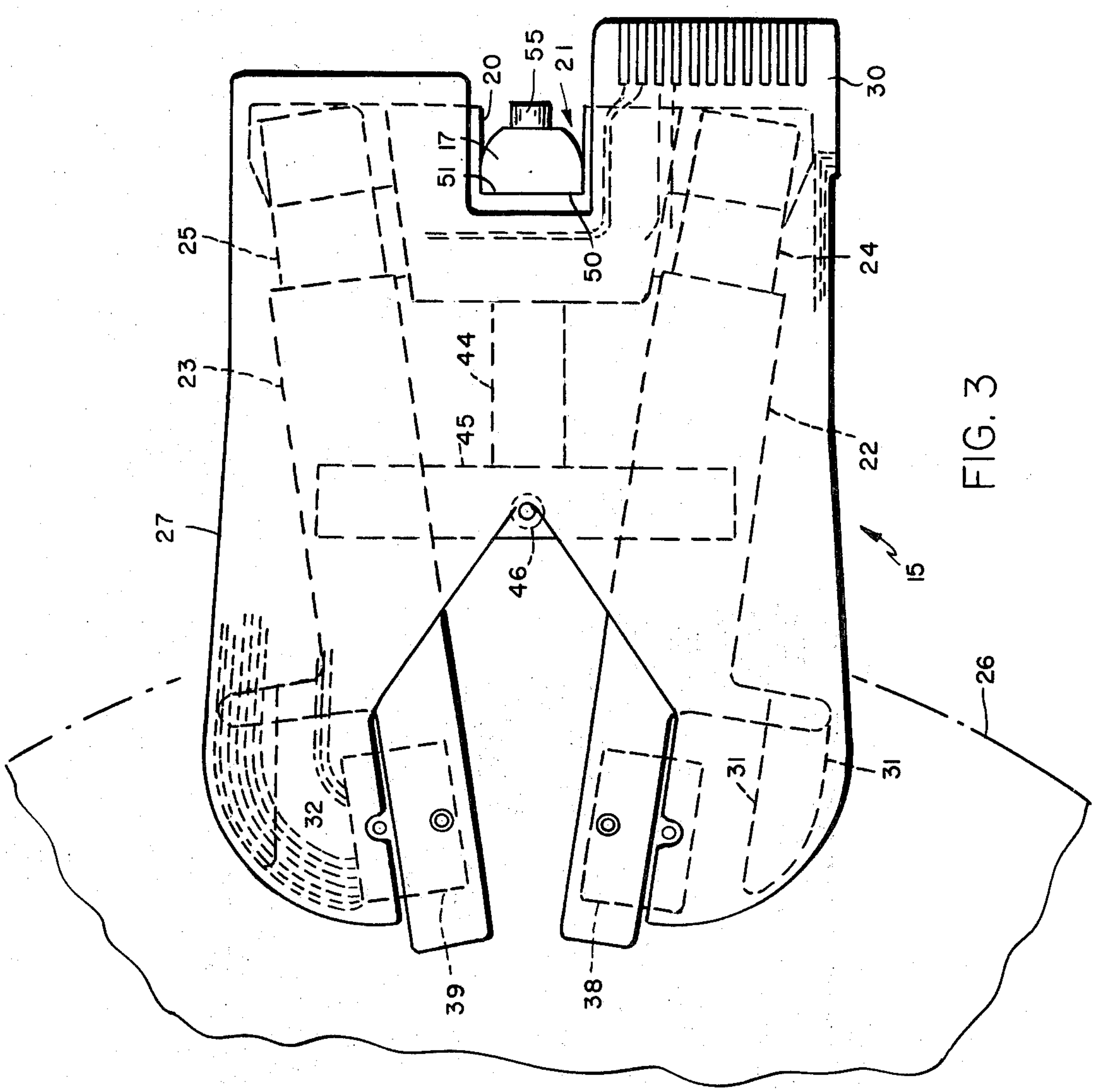
FIG. 3 shows a plan view of one side of an exemplary arm assembly of the embodiment of the invention of FIG. 1.

A flexible spring-like member 44 is fixedly attached at one end thereof to the central region of mounting plate 20 effectively opposite cutout portion 21. Flexible member 44 is attached at its other end to a relatively rigid cross-bar member 45 which is adaptable for contact with the suspension arms 22 and 23, as shown. A cam-riding button 46 is affixed substantially in the center of rigid cross-bar member 45 at the surface thereof opposite to the surface which contacts the suspension arms. A cam surface 47 is associated with each arm assembly as shown in FIGS. 2 and 3. As discussed in more detail below, when the overall arm assembly is in its operative position opposite the surface of the magnetic disk, the head pads and associated recording heads form an air bearing between the recording heads and the recording surface of the disk on which the freely suspended recording heads ride and the cam button rests in depression 47A of cam surface 47.

It it is desired that the arm assembly be removed to its non-operative position wherin the recording heads are placed in a non-tracking position away from the magnetic disk surface, the arm assembly shaft is rotated to its non-operative position as discussed in more detail later. During such rotation, the cam-riding button is arranged to ride over its associated cam surface 47, the button thereby moving out from depression 47A which causes the rigid cross-bar member 45 to lift both suspension arms 22 and 23 so as to remove the recording heads from their air bearing positions adjacent the magnetic disk surface. The overall arm assembly is then safely rotated to its non-tracking position without permitting the recording heads to touch the disk surface.

The recording heads ride on their air bearings at a force of approximately 2 pounds against the disk surface and, accordingly, a second arm assembly, invertedly mounted, is used wtih respect to the disk surface on the opposite side of the disk so that the overall forces are counterbalanced at each side thereof, as shown in FIG. 6.

Arm assembly 15 is suitably affixed to rotatable shaft 17 via the cutout portion 21 of mounting plate 20. As can be seen best in FIG. 7, shaft 17 is so shaped as to have a flat surface 50 which, when the cutout portion is positioned to enclose the shaft, buttresses against an inner flat surface 51 of cutout 21. Shaft 17 has a cylindrical opening 52 therethrough which is aligned with a corresponding opening 53 centrally located in mounting plate 20, the diameters of such openings being equal. Opening 53 extends further into mounting plate 20, the extension 54 thereof having a reduced diameter and being internally threaded. An appropriate threaded fastener, such as screw 55, having a shank 56 of the same length and diameter as openings 52 and 53 and a threaded tip 57 having a reduced diameter is adapted to be inserted through openings 52 and 53 and thereupon threadably secured to the mounting plate at threaded extension 54. When so affixed, arm assembly 15 is retained in a fixed relationship with reference to shaft 17. The width of cutout portion 21 of mounting plate 20 is substantially equal to the diameter of shaft 17 so that the shaft fits snugly therein with its flat surface 50 held tightly against the inner flat surface 51 of cutout 21, as shown best in FIG. 7. Accordingly, when the arm assembly 15 is attached to shaft 17 it is located at a desired orientation with respect thereto in the three linear coordinate directions *x*, *y* and *z*, as well as in its angular orientation with reference thereto, as discussed in more detail below. The arm assembly dimensions are such that thermal effects of the environment do not cause any appreciable thermal displacements of the assembly and, hence, no appreciable movement in the positioning of the recording heads with respect to their associated tracks occurs during use.

Figure 10:
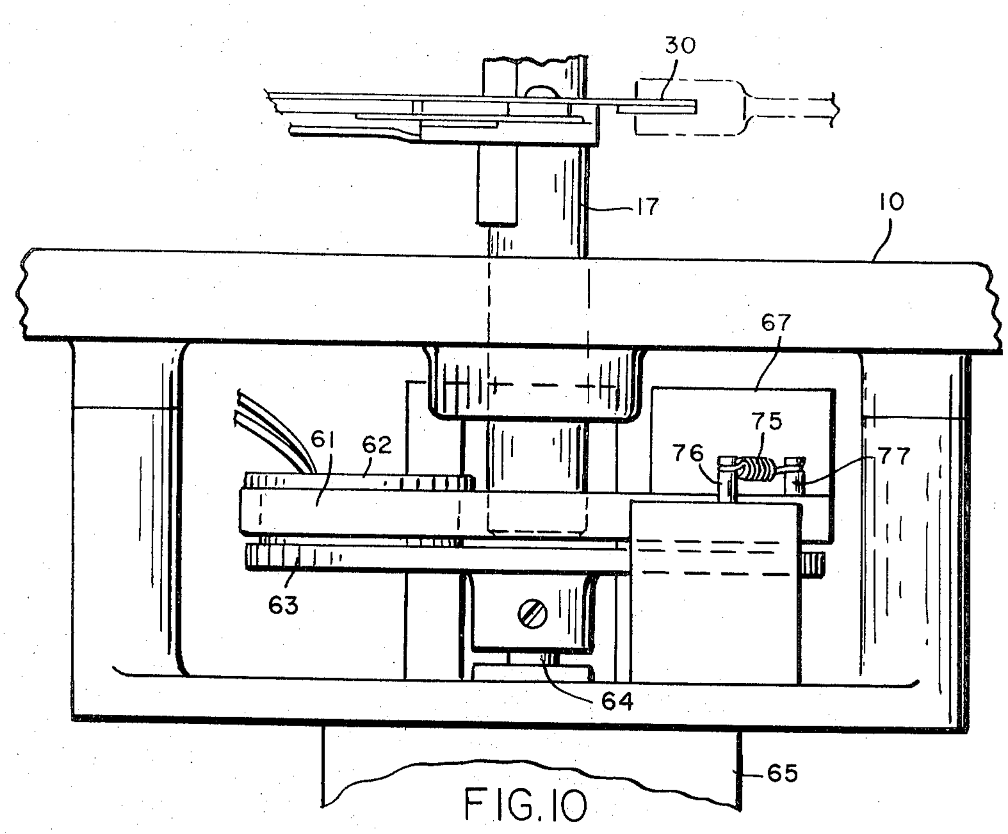
FIG. 10 shows a side view of an exemplary arm assembly mounting and positioning mechanism of the embodiment of the invention of FIG. 1.
Figure 11:
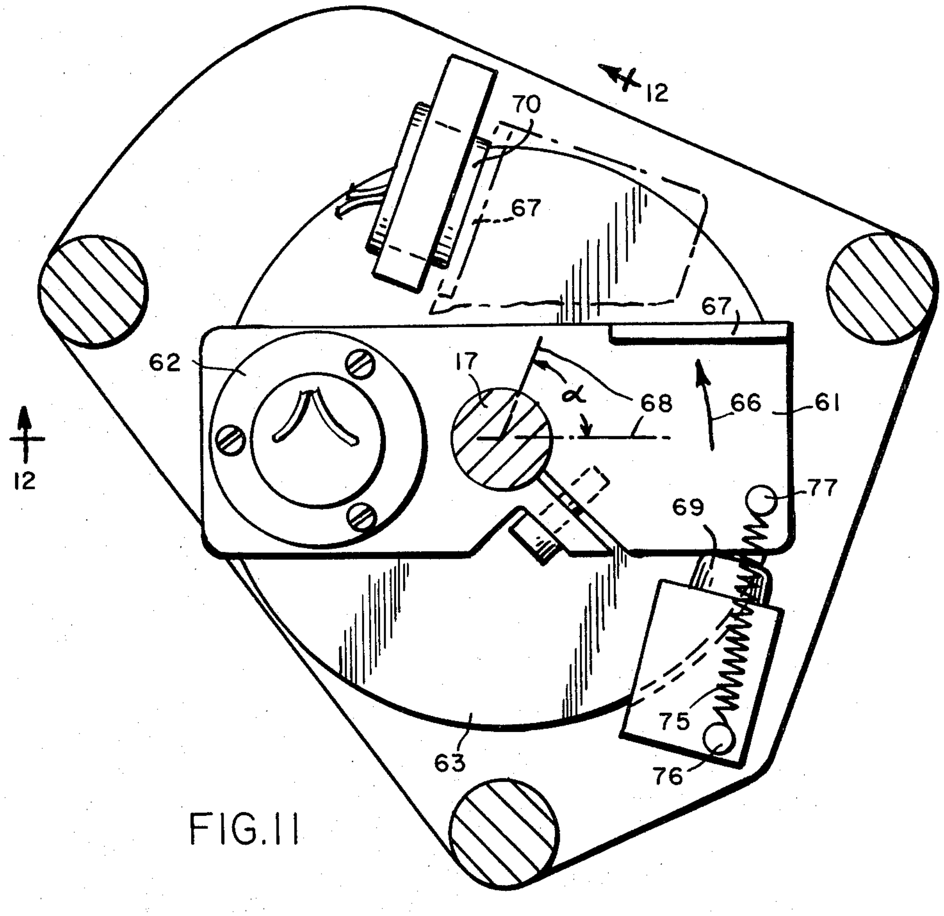
FIG. 11 shows a plan view of the mechanism of FIG. 10.
Figure 12:
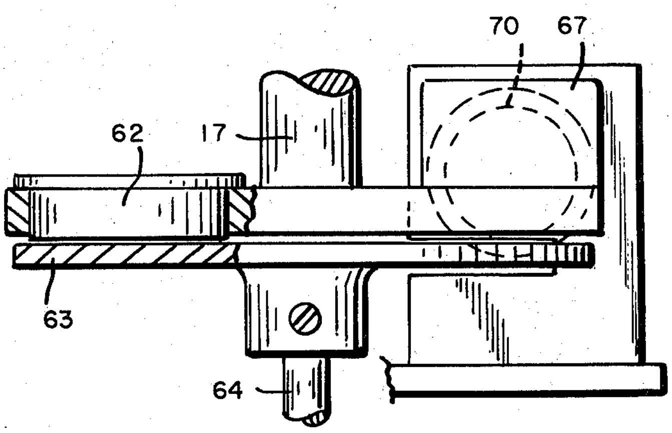
FIG. 12 shows a side view in cross-section taken along the line 12—12 of FIG. 11.

The arm assembly shaft driving and positioning mechanisms are described in more detail in FIGS. 10–12. As shown therein, the shaft 17 extends through suitable bearing surfaces (not shown) in frame 10 and is attached at its lower end to a substantially rectangularly shaped member 61 which has a solenoid element 62 mounted thereon. A disk shaped member 63 of magnetic material is mounted below and adjacent to member 61, member 63 being fixedly attached at its center to a shaft 64 of a motor 65, as shown in FIG. 10. So long as no current is present in the coil of solenoid 62, there is no magnetic attractive force between member 61 and the upper surface of disk member 63. However, as soon as a current is applied to the coil of solenoid 62 the magnetic element of solenoid 62 is attracted to the surface of disk member 63 with an appropriate magnetic force so that the two are magnetically coupled in a relatively tightly joined relationship so that rotating movement of the disk via shaft 64 causes appropriate rotating movement of projecting member 61 as shown by arror 66 in FIG. 11 and, hence, a corresponding rotating movement of shaft 17.

Member 61 has an upwardly projecting magnet element 67 positioned along one side thereof at a region remote from shaft 17, member 61 and, hence, shaft 17 being permitted to travel through a limited angle shown by the angle "$\alpha$" formed by phantom lines 68, such limits being determined at each end by stop members 69 and 70. Stop member 69 is fixedly attached at an appropriate point to the frame 10 of the apparatus and comes into contact with a side surface of member 61 to limit the travel thereof in one direction at a position as shown in FIG. 11. The travel of member 61 is limited in the other direction by solenoid stop member 70 which is fixedly attached to the frame of the apparatus at a point which establishes a predetermined operative relationship between the arm assembly 15 affixed to shaft 17 and the surface of the magnetic disk when the magnet element 67 comes into contact with the stop member 70. Thus, during operation a current is applied to the coil of solenoid stop member 70 which thereupon tightly couples magnet element 67 to the stop member 70 so as to retain projecting member 61 in a stopped position (as shown in dashed outline in FIG. 11) at which position shaft 17 is at a predetermined angular orientation relative to the magnetic disk of the overall apparatus. Accordingly, when the shaft is in such fixed predetermined position with magnet element 67 tightly coupled to holding solenoid stop member 70, the arm assembly 15 is correctly positioned relative to the magnetic disk surface in its operative position and the recording heads 29 thereof are correctly aligned with their associated tracks on the magnetic disk surface.

A spring element 75 is fixedly attached at one end to a stand-off 76 on stop member 69, the other end being attached to a stand-off 77 on member 61 as shown in FIGS. 10 and 11. If holding solenoid stop member 70 is not operative (i.e., no current is applied to the coil thereof), spring 75 exerts a counterforce on member 61 by which member 61 and shaft 17 are rotated to their non-operative position where the side of member 61 is buttressed against stop member 69. If it is desired to cause the apparatus to be placed into operation, the application of power thereto causes a current to be applied to the coil of solenoid 62 which in turn causes projecting member 61 to be magnetically coupled to the disk member 63 which is rotating in the direction shown by arrow 66. Accordingly, projecting member 61 is moved from its non-operative "stop" position to its operative "stop" position where magnet element 67 is magnetically coupled to holding solenoid stop member 70, shaft 17 thereby being placed in its correct operative angular rotation as desired. The buttressing of holding stop member 70 against magnet element 67 causes an electronic sensing and switching circuit to be completed in order to shut off power to motor 65 and to remove the actuation current from solenoid 62 to assure that shaft 17 remains held in its correct angular operative position as desired.

Should power to the overall appratus fail, for any reason, and it is desired that the arm assembly with its recording heads be removed from their operative position adjacent the magnetic storage disk surface, which latter surface would be decelerating, current is removed from the solenoid of holding stop member 70. Accordingly, the force of spring 75 pulls member 61 away from its operative "stop" position adjacent stop member 70 to its non-operative "stop" position adjacent stop member 69. When power is again applied, the shaft is then moved back to its operative position in the manner described above.

Figure 13:
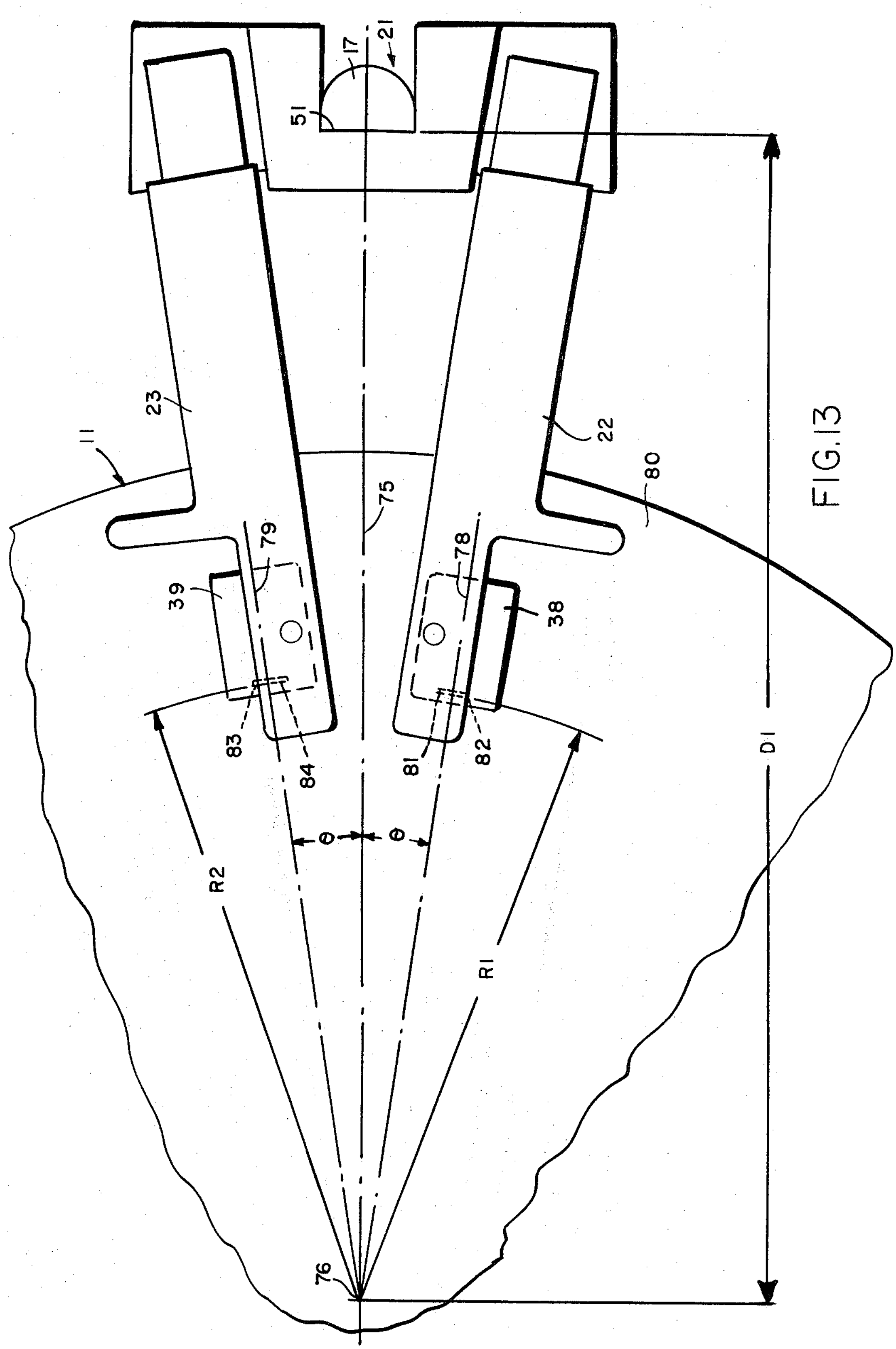
FIG. 13 shows a diagrammatic view of the geometric relationships among the arm assembly and its associated recording heads, the positioning mechanism, and the disk of one configuration of the invention.

FIG. 13 shows the geometric relationships among various elements of an arm assembly with respect to each other and with respect to the shafts on which the arm assembly is mounted, and th recording disk with which is is used. As can be seen therein, in the fabrication of arm assemblies in accordance with the principles of the invention, the suspension arms 22 and 23 are arranged so that the head pads 38 and 39, respectively, lie in specified angular positions with respect to a reference line 75 extending from the center of shaft 17 to a reference point 76. Thus, the center lines 78 and 79 of head pads 38 and 39, respectively, are disposed at equal angles "$\theta$" on either side of reference line 75. The head pads are then positioned along their center lines so that the difference between the radii $R_1$ and $R_2$, as defined below, is set at a predetermined value, such value effectively representing the desired displacement of the recording tracks on the surface 80 of the recording disk. As further seen therein, $R_1$ is defined as the radial distance from reference point 76 to the leading, or inner, edge 81 of the innermost recording head element 82 on head pad 38 of arm 22. Similarly $R_2$ is defined as the radial distance from reference point 76 to the leading, or inner, edge 83 of innermost recording head 84 on head pad 39 of arm 23.

Accordingly, once such relationships are established for a particular arm assembly, the recording heads on such arm assembly will always be accurately aligned with their associated recording tracks during use so long as the same arm assembly is used with the same magnetic disk recording surface.

In order to provide for interchangeability of arm assemblies with respect to a specified disk, a suitable reference distance, such as the distance "$D_1$, " from the flat surface 51 where shaft 17 buttresses against the cutout portion 21 to the reference point 76 can be established at a preselected value which is the same for each arm assembly being fabricated. Further, preselected values for the radii $R_1$ and $R_2$ are also established. The establishment of such values permits arm assemblies fabricated in accordance therewith to be interchangeably used in association with a specified disk on which data is to be recorded and/or retrieved.

Finally, in order to provide for interchangeability of disks, the distance "$D_1$" can be established at a preselected value equal to the distance from the surface 51 to the center 13A of shaft 13 on which the disks are rotated, reference point 76 thereby coinciding with center point 13A. When such distance is established, disks can be interchanged with arm assemblies that have been fabricated in accordance with such value.

Accordingly, it becomes a relatively easier task to provide for interchangeability of arm assemblies and magnetic disks in the system of the invention without disturbing the alignment of the recording heads with respect to their associated recording tracks, once the latter have been established.

Although the specific embodiment of the arm assembly described herein includes a pair of suspension arms, it is clear that such assembly can include more than two such arms. Such a multiple arm configuration can be arranged in a manner such that the recording heads of the head pads associated with arms thereof are appropriately interlaced in a manner similar to that discussed above with reference to the dual arm assembly.

Figure 14:
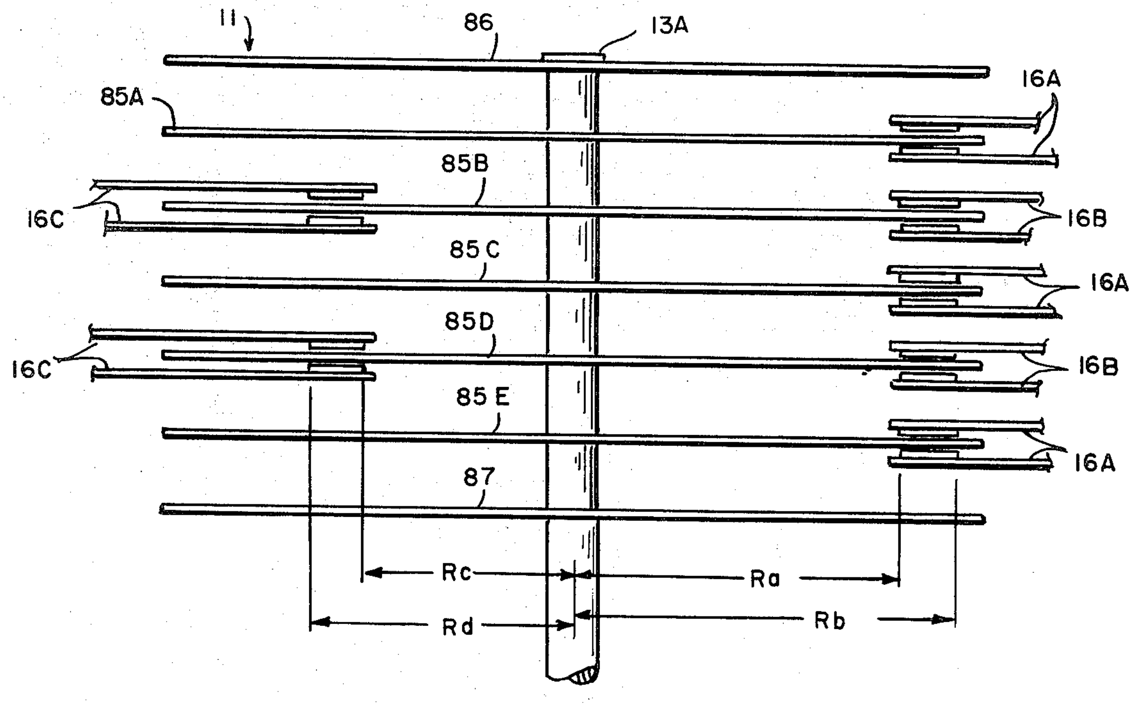
FIG. 14 shows a simplified diagrammatic view of a portion of the apparatus of the invention depicting a representative configuration of the arm assemblies and disks used therein.

Further, with reference to FIG. 1, the embodiment shown therein utilizes three arm assembly stations 15 each with a plurality of arm assemblies for use with associated surfaces of the magnetic disk pack 11. The invention, of course, is not to be limited to the use of three arm assembly stations as the number of arm assembly stations and arm assemblies associated therewith will depend on the particular application for which the apparatus is being used. One appropriate configuration, as described wtih reference to FIG. 1, is shown in an effectively diagrammatic fashion in FIG. 14 wherein a plurality of magnetic disks of a disk pack 11 each having recording surfaces on both sides thereof are shown by disk 85A through 85E. A first plurality of arm assemblies, in this case six such arm assemblies 16A are mounted, for example, at one of the arm assembly stations and are used in association with the recording surfaces of alternating disks 85A, 85C and 85E of the disk pack 11, as shown. An additional four arm assemblies 16B are mounted at a second arm assembly station and are used in association with the recording surfaces of intermediate disks 85B and 85D of disk pack 11, as shown. In the particular embodiment shown, the end disks 86 and 87 may be essentially unused for data recording purposes. Thus, with the use of the two arm assembly stations described above a plurality of recording tracks associated with each of the head pads of each arm assembly are formed, all of such tracks being positioned on the disk surfaces involved at radial distances lying within the same radial range from $R_a$ to $R_b$ , as shown. If it is desired to utilize recording tracks at radial distances lying within a different range on the recording surfaces of the disks involved, the third station can be used to arrange for the recording heads on a plurality of arm assemblies thereof to be positioned at a different region of the recording surfaces of one or more of the same disks. The recording regions used for the recording heads associated with the third station, for example, may be closer to the center of the disks, i.e., within a radial range from $R_c$ to $R_d$, as shown. In such a case the mounting post, or shaft, 17 on which the arm assemblies are located, is positioned at a different radial distance with respect to the center 13A of the shaft on which the magnetic disks are rotated. Thus, in the embodiment shown, arm assemblies 16C are used with disks 85B and 85D to record and retrieve information on tracks located with the radial range from $R_c$ to $R_d$.

Variations in the basic configuration discussed above in FIG. 14 may be devised utilizing the same type of arm assembly stations and arm assemblies thereof, such variations depending on the applications for which the apparatus is to be used and the availability of space for placing the necessary number of arm assemblies adjacent the disk pack.

Accordingly, the invention is not to be limited to the particular embodiment shown and described herein except as defined by the appended claims.

What is claimed is:

1. A magnetic disk memory system comprising at least one rotatably mounted magnetic disk adapted to have a plurality of data tracks recorded on a surface thereof;

at least one arm assembly station being positioned adjacent said recording disk and including one or more arm assemblies each having at least a pair of end portions, each said arm assembly having a plurality of recording heads mounted on each of said end portions, each of said recording heads corresponding to one of said data tracks on said disk surface; and the plurality of recording heads mounted on each of said end portions of each said arm assembly being fixedly arranged in a radial direction so that they have a fixed, interlaced relationship with respect to the plurality of recording heads mounted on the other end portions of the same said arm assembly.

2. A magnetic disk memory system in accordance with claim 1 wherein said one or more arm assemblies are reciprocally movable into and away from fixed operative positions with reference to said data tracks and further including means for controllably moving said one or more arm assemblies into and away from said operative positions so that when said arm assemblies are in said operative positions with reference to said disk, each of said interlaced recording heads is aligned with its said corresponding data track.

3. A magnetic disk memory system in accordance with claim 1, wherein each of said plurality of recording heads is mounted in a head pad member, said head pad member being flexibly mounted on its corresponding end portion.

4. A magnetic disk memory system in accordance with claim 3, wherein said arm assembly station includes means for mounting said arm assemblies at said station and further wherein each said arm assembly includes a mounting plate adapted to be mounted to said mounting means; and at least a pair of suspension arms each attached at one end to said mounting plate, the other ends thereof forming said end portions.

5. A magnetic disk memory storage system in accordance with claim 4 wherein said suspension arms extend from said mounting plate in angularly disposed directions with reference to one another.

6. A magnetic disk memory storage system in accordance with claim 5 wherein said angularly disposed directions converge toward one another at preselected angles.

7. A magnetic disk memory storage system in accordance with claim 4 wherein said recording heads form an air bearing relationship with the surface of said disk when said arm assembly is in an operative position and further including a cross-bar member flexibly attached to said mounting plate adjacent said suspension arms; and means for moving said cross-bar member to contact said suspension arms simultaneously whereby said suspension arms can be lifted from said operative position and the recording heads thereon removed from their air bearing relationship with the surface of said disk.

8. A magnetic disk memory storage system in accordance wtih claim 7 wherein said cross-bar member moving means includes a cam surface; and a contact element affixed to said cross-bar member for riding on said cam surface.

9. A magnetic disk memory storage system in accordance with claim 3 wherein said head pad members are each mounted on a spring-like element, each said element having a pair of tabs bonded to a corresponding pair of mounting posts affixed to said suspension arm, whereby said head pad members are positioned in flexible spaced relationships with said suspension arms.

10. A magnetic disk memory storage system in accordance with claim 9 wherein each said head pad member has 16 recording heads mounted therein in parallel spaced relationships.

11. A magnetic disk memory system in accordance with claim 2 wherein each of said plurality of recording heads is mounted in a head pad member, said head pad member being flexibly mounted on its corresponding end portion.

12. A magnetic disk memory system in accordance with claim 11 wherein each said arm assembly includes a mounting plate adapted to be fixedly mounted to said controllable moving means; and at least a pair of suspension arms each attached at one end to said mounting plate, the other ends thereof forming said end portions.

13. A magnetic disk memory storage system in accordance with claim 12 wherein said suspension arms extend from said mounting plate in angularly disposed directions with reference to one another.

14. A magnetic disk memory storage system in accordance with claim 13 wherein said angularly disposed directions converge toward one another at preselected angles.

15. A magnetic disk memory storage system in accordance with claim 14 wherein said recording heads form an air bearing relationship with the surface of said disk when said arm assembly is in its operative position and further including a cross-bar member flexibly attached to said mounting plate adjacent said suspension arms; and means for moving said cross-bar member to contact said suspension arms simultaneously whereby said suspension arms can be lifted from said operative position and the recording heads thereon removed from their air bearing relationship with the surface of said disk.

16. A magnetic disk memory storage system in accordance with claim 15 wherein said cross-bar member moving means includes a cam surface; and a contact element affixed to said cross-bar member for riding on said cam surface.

17. A magnetic disk memory storage system in accordance with claim 16 wherein said head pad members are each mounted on a spring-like element, each said element having a pair of tabs bonded to a corresponding pair of mounting posts affixed to said suspension arm, whereby said head pad members are positioned in flexibly spaced relationships with said suspension arms.

18. A magnetic disk memory storage system in accordance with claim 17 wherein each said head pad member has 16 recording heads mounted therein in parallel spaced relationships.

19. A magnetic disk memory storage system in accordance with claim 12 wherein said controllable arm assembly moving means includes a shaft; and means for controllably rotating said shaft;

said mounting plate having a cut-out portion with a preselected configuration, said mounting plate being mounted on said shaft at said cut-out portion; and means for keyably mounting said mounting plate to said shaft at said cut-out portion.

20. A magnetic disk memory storage system in accordance wtih claim 19 wherein the configuration of said cut-out portion is rectangular and said shaft has a flat portion in the region where said mounting plate is to be mounted, which flat portion buttresses against one side of said cut-out portion; and said keyable mounting means includes an opening through said shaft opposite said cut-out portion;

an opening in said mounting plate corresponding to and having the same diameter as the said opening through said shaft;

a further threadable opening extending from said mounting plate opening and having a reduced diameter; and fastener means having a threadable tip, said fastener means extending through said openings in said shaft and said mounting plate and being threadably secured to said further threaded opening in said mounting plate whereby said arm assembly is fixedly mounted in a preselected relationship with said shaft.

21. A magnetic disk memory storage system in accordance with claim 19 wherein said means for controllably rotating said shaft includes a motor means having a rotating motor shaft;

a rotating disk member affixed to said motor shaft;

a projecting member mounted at the end of said arm assembly rotatable shaft adjacent said disk member;

solenoid means mounted on said projecting member so that when said solenoid means are actuated said projecting member is magnetically coupled to said disk member so that said arm assembly rotatable shaft is thereby rotated by said motor means.

22. A magnetic disk memory storage system in accordance with claim 21 and further including a stop element mounted on said projecting member;

a first stop member fixedly mounted in a first predetermined spatial relationship with reference to said rotating shaft whereby when said rotatable shaft is rotated to its operative position said stop element buttresses against said first stop member and retains said rotatable shaft in said operative position; and solenoid means for magnetically coupling said stop element and said first stop member when they are in said buttressed relationship.

23. A magnetic disk memory storage system in accordance with claim 22 and further including a second stop member fixedly mounted in a second predetermined spatial relationship with respect to said rotatable shaft and displaced from said first stop member;

spring means fixedly mounted at one end and affixed at its other end to said projecting member so that, when the magnetic coupling between said stop element and said first stop member is removed, said projecting member is rotated to a position where a portion of said projecting member moves into buttressing contact with said second stop member so that said rotatable shaft is placed in a non-operative position.

* * * * *